May 29, 1956

E. W. JACOBSON 2,747,741

DEVICE FOR CONTINUOUS REMOVAL OF SOLIDS FROM FLUIDS

Filed Aug. 21, 1952

INVENTOR.
E. W. JACOBSON
BY
ATTORNEY

May 29, 1956 E. W. JACOBSON 2,747,741
DEVICE FOR CONTINUOUS REMOVAL OF SOLIDS FROM FLUIDS
Filed Aug. 21, 1952 2 Sheets-Sheet 2

INVENTOR.
E. W. JACOBSON
BY
*Hman Hcook*
ATTORNEY

United States Patent Office 2,747,741
Patented May 29, 1956

2,747,741

DEVICE FOR CONTINUOUS REMOVAL OF SOLIDS FROM FLUIDS

Eugene W. Jacobson, Oakmont, Pa., assignor to Gulf Research & Development Company, Pittsburgh, Pa., a corporation of Delaware Application August 21, 1952, Serial No. 305,603

6 Claims. (Cl. 210—165)

This invention relates to a device for continuous removal of solids from fluids, and more particularly to a device to be interposed in a conduit to remove solids from the fluid flowing therethrough.

Industrial operations include the large scale transmission by pipe line of various fluids, liquid and gaseous, and it is unavoidable that some foreign matter finds its way into the fluid. If not removed from the stream of fluid, the solid matter finds its way to various points where its presence causes damage. Commonly found entrained solids are mill scale in the conduit, corrosion product, and chips, dirt, and other solid particles, which get into a line negligently or unavoidably when repairs are made. This material will interfere with the operation of valves; in the case of steam it can tear up turbine blading; it damages meters and causes their readings to be inaccurate, and leads to many unnecessary shutdowns.

In the case of the gas industry and petroleum industry the problem of entrained material is particularly troublesome because these materials come out of the ground and carry along various solids such as silica or quartz sand, iron oxide and sulfides, metallic particles, crystalline salt, carbon and sulfur. Some of these particles are of extremely small size and others range up to an inch or more in dimension.

Removal of foreign matter from liquids on an industrial scale has involved the use of a wide variety of strainers, sediment tanks, filters, and centrifugal devices. Strainer elements have embraced textile fabric, wire gauze, perforated metallic sheets and multiple-bar strainers. In some instances an effort has been made to reduce the clogging of the strainer elements by the use of mechanical scrapers or brushes but these have not proven completely successful.

Considerable difficulty has been encountered when a fluid carrying solids impinges against the straining surface, due to the fact that the velocity head of the impinging material forces suspended solids into the apertures of the strainer surface and thus clogs the device. This clogging becomes progressively more serious with a decrease in the size of the filtering apertures, and an improved design of strainer element which will decrease this tendency is greatly desired. This is one of the objects of my invention.

Another object of my invention is to provide a device for the removal of solids from fluids which will operate in a continuous manner without the necessity of frequent shutdowns for disassembling and cleaning.

Another object of my invention is to provide a device which will remove the maximum possible proportion of entrained solids from a liquid without accumulating them on the strainer surface.

Another object of my invention is to provide a strainer surface composed of parallel bars, with the bars so arranged that rejected solids will tend to drift away from the point at which they are separated and not continue to block that point of the strainer surface, and likewise not to drift on to other portions of the strainer surface.

Another object of my invention is to provide a further improved device in which any material tending to cling to the strainer surface will be forcibly removed therefrom.

Referring to the drawings Figure 1 shows one embodiment of my invention in vertical section.

Figures 3, 4 and 5 are enlarged vertical sectional views of specific forms of the strainer bars of my invention.

Figure 5 is a perspective view of the upper portion of the frusto-conical shield 11 described below.

Figure 1:
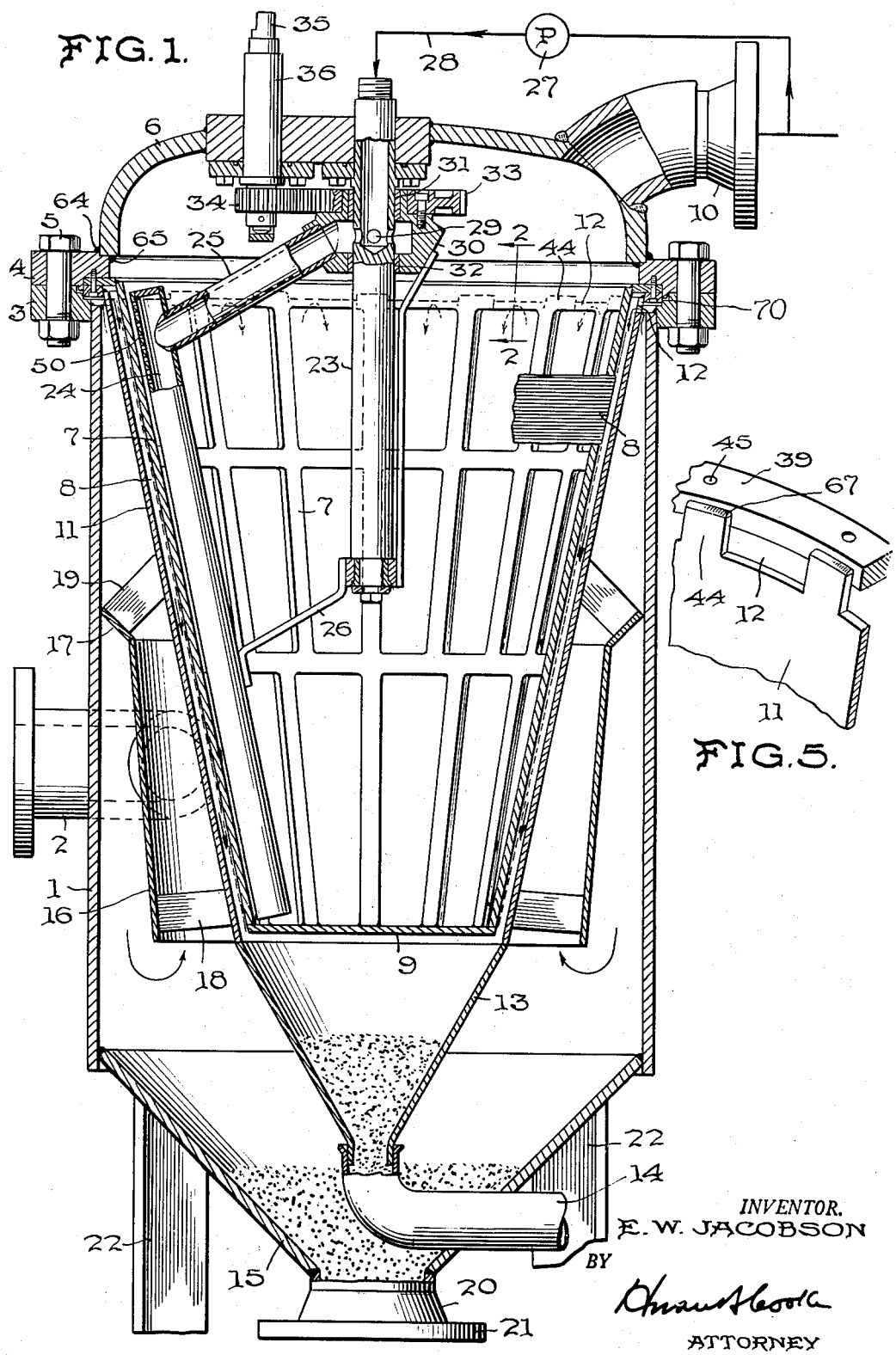

Referring now to the drawings in detail, in which like reference numerals designate the same parts throughout the several views, cylindrical shell 1, with its head 6 and conical base 15 constitutes the enclosing shell. The top of cylindrical shell 1 carries a flange 3, and the lower portion of head 6 carries a companion flange 4. These two flanges are fastened together by bolts 5. Cylindrical shell 1 is provided with an inlet connection 2 and this connection enters shell 1 in a tangential manner, as shown.

Head 6, fitted with flange 4, serves to close the top of the apparatus. The rigid frame 7 has the general shape of an inverted truncated cone, and this rigid frame carries the strainer surface 8 on its outer surface. At its top, rigid frame 7 carries flange 37, with which it is made integral by weld 66. Elements 7 and 8 together constitute the strainer element of my device. The interior of the strainer element is open at the top into head 6 and is closed at the bottom by a solid plate 9. Fluid which has passed through the strainer leaves my device through connection 10.

Surrounding strainer surface 8 and slightly removed therefrom is a frusto-conical shield 11. Shield 11 is made of solid plate in the portions adjacent to the strainer surface, but at its top extremity it carries a number of ports 12 through which passes the fluid to be strained. Shield 11 extends from the very top of the strainer element to the very bottom, totally surrounding it, and below the bottom of the strainer element it terminates in a conical collecting zone 13. Conical collecting zone 13 receives material rejected by the strainer element, and a reject discharge connection 14 connects to the base of conical section 13 and passes outward through the enclosing shell 15 to carry away the rejected material. Interposed between inlet connection 2 and the ports 12 at the top of shield 11 is a baffle 16. That baffle is either cylindrical in form, or it may be frusto-conical, as shown in Figure 1. Ring 17 is welded to the top of baffle 16 and fits closely inside shell 1. Baffle 16 and ring 17 are attached to shield 11 by means of plates 18 and 19. Cone bottom 15 of the enclosing shell terminates with pipe connection 20 and flange 21. Any solids precipitated in cone bottom 15 would be conducted out of the system by a conduit leading from connection 20, or cone bottom 15 can be closed with a solid plate and the precipitated material removed from time to time, as required. The entire device stands on legs 22.

A shaft 23, positioned on the longitudinal axis of rigid frame 7 extends downward from head 6. A cleaning-nozzle manifold 24, carried by manifold-arm 25 and brace 26, is provided to rotate about shaft 23. Cleaning-nozzle manifold 24 is hollow and is constructed to extend from the top to the bottom of the strainer surface 8. It is closed at each end and carries a number of perforations or longitudinal slots 50 designed to direct jets of fluid against the inside face of strainer surface 8.

Shaft 23 and manifold-arm 25 are hollow, with their interiors in open communication, to provide a conduit for fluid which is supplied thereto from pump 27 through pipe 28. Such fluid passes through the hollow upper stem of shaft 23, and outward therefrom through radial ports 29 in the wall of the shaft. The section of shaft 23 which is bored with ports 29 is surrounded by a bearing housing 30, carrying bearings 31 and 32 at its upper and lower ends respectively. This bearing housing 30 is recessed on its interior face, opposite the ports 29, to form a passage for liquid on its way from hollow shaft 23 to manifold arm 25. Manifold-arm 25 is carried by bearing housing 30. Bearing housing 30 also carries a gear wheel 33. This gear wheel 33 is driven by a pinion 34, which is on the lower end of drive shaft 35. A stuffing box 36 seals the entry of drive shaft 35 through head 6.

Figure 2:
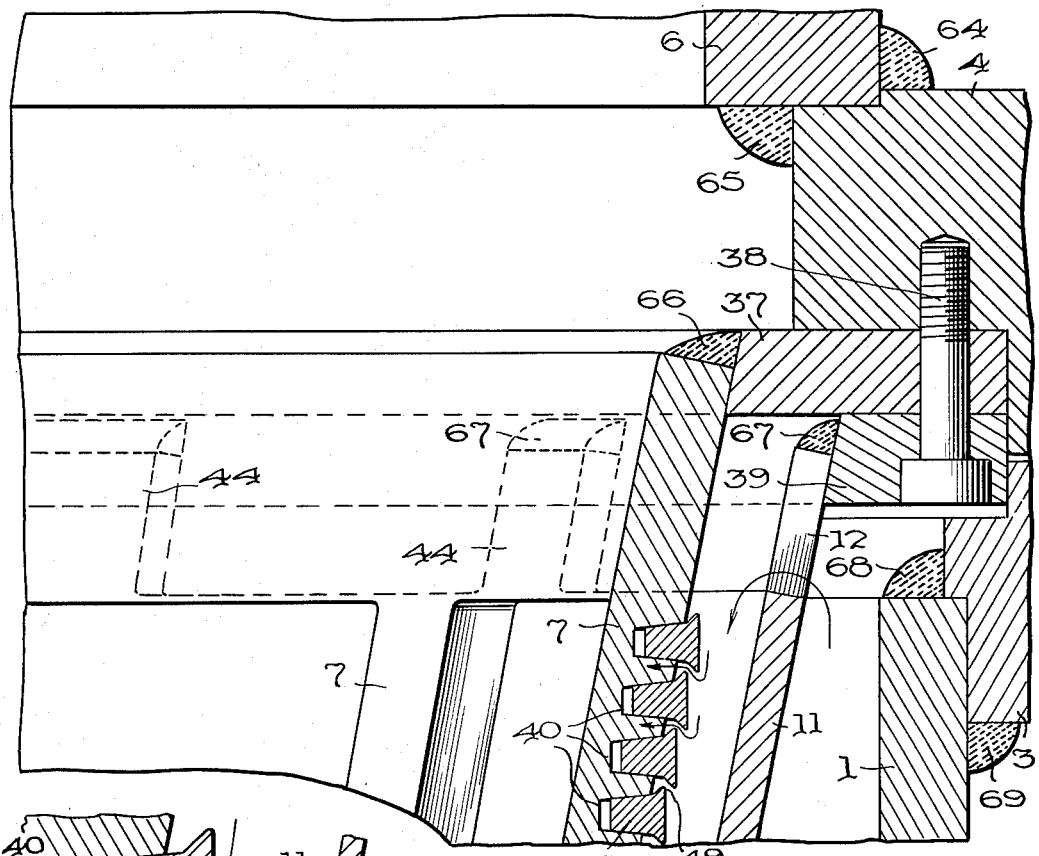
Figure 2 is an enlarged vertical section taken along line 2—2 of Figure 1 and looking in the direction indicated by the arrows.

Figure 2 shows the construction of the strainer element on a larger scale than Figure 1. Referring to Figure 2, at the top of the figure is cover 6, with its flange 4. In the specific construction shown, these two are separately constructed and then welded together at 64 and 65. Flange 4 is recessed to receive flanges 37 and 39. Flange 37 is the top flange of rigid frame 7, to which it is welded at 66. Flange 39 is the top flange of shield 11, to which it is welded at 67. Flange 3 is shown welded to cylindric shell 1 at 68 and 69. Flanges 37 and 39 are the means by which the rigid frame 7 and shield 11 are supported in the device. Flanges 37 and 39 are fastened to flange 4 by means of bolt 38 and the entire assembly is then made fluid-tight by tightening up bolts 5 on companion flanges 3 and 4 against gasket 70, which latter is positioned between the said flanges 3 and 4.

Shield 11 is cut away at the top to provide ports 12 between lugs 44. The lugs 44 of the shield 11 are attached to ring 39 by weld 67, and ports 12 are provided for the passage of unstrained fluid from the outer shell to the passageway between shield 11 and the strainer surface 8, carried on rigid frame 7.

The outer face of rigid frame 7 carries a series of recesses 40 designed to receive the base of strainer bars 41. These recesses may be cut either as a series of individual circular recesses or as one helical recess extending from the top of rigid frame 7 to the bottom thereof. If they are cut as a series of complete circular recesses, the individual strainer bars 41 will be a series of individual rings, set in the recess 40 and welded at their joints. If the recess is cut in the form of a helix it is then possible to construct the strainer surface with a single piece of strainer-bar material 41 coiled around the recess from top to bottom. In either case adjacent recesses 40 are spaced apart by a distance selected to maintain the outer faces of the strainer rings at such a distance 49 from one another as will give the desired width of opening in the strainer surface 8, which latter they collectively constitute.

A fragmentary view in Figure 1 shows the strainer surface 8, made up of a number of strainer bars 41.

Figure 3:
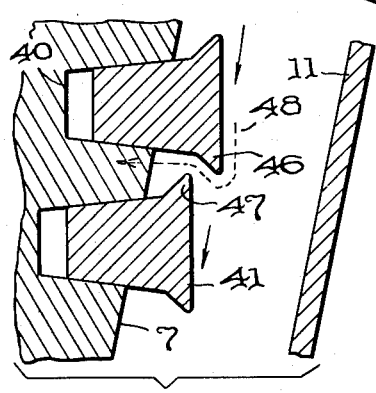

Figure 3 is an enlarged sectional view showing rigid frame 7, recesses 40, strainer bars 41 and the adjacent shield 11. The cross-sectional shape of bars 41 is chosen for a special purpose which will be subsequently described.

Figure 4:
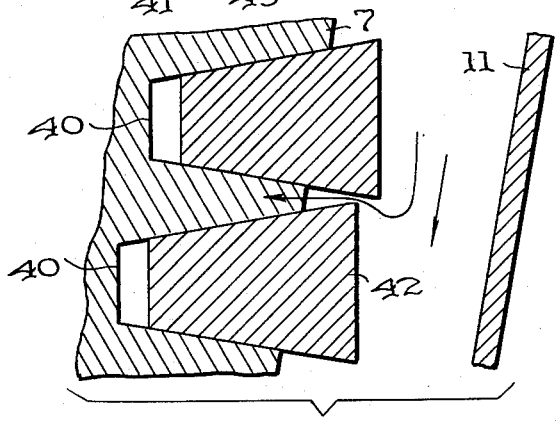

Figure 4, like Figure 3, is an enlarged sectional view showing rigid frame 7, recesses 40, strainer bars 42 and adjacent shield 11. Bars 42 are somewhat different in cross-section from bars 41 in Figure 3, as will be subsequently described.

Figure 5 is an enlarged view showing the upper part of frusto-conical shield 11, terminating in lugs 44; and flange 39 which is welded to lugs 44 at weld 67. Holes 45 are provided to receive bolts 38.

The operation of my device is as follows. The fluid to be filtered enters the device through inlet connection 2. As previously described, this connection enters the outer shell 1 tangentially, and consequently the incoming fluid is given a rotary motion. Slightly inside of cylindrical shell 1 is baffle 16. That baffle, coacting with cylindrical shell 1, provides an annular space in which the tangentially introduced oil flows in a circular path, causing the larger and heavier suspended particles to be thrown against the inner surface of cylindrical shell 1, from which it drifts to the bottom of conical base 15. A ring 17 is provided to close the space between the top of baffle 16 and cylindrical shell 1. This ring 17 causes the introduced fluid to move downwardly outside of baffle 16 as well as to adopt a rotative motion. The fluid passes under the bottom of baffle 16 and thereupon must reverse its direction and start to move upward in the passage between baffle 16 and shield 11. This changing of direction in the flow of the fluid sets up a certain centrifugal force which has a further tendency to precipitate heavy suspended matter at this point. The fluid flows upwardly all the way from the bottom of baffle 16 to the top of shield 11, and at that point it passes through ports 12 at the top of shield 11, and thereby finds its way into the narrow zone between shield 11 and strainer surface 8. The strainer surface 8 does not extend to the very top of rigid frame 7, but commences at a point just below the bottom of ports 12. Strainer surface 8 starts below the bottom of ports 12 because it is a fundamental purpose of my invention to not permit the body of fluid to approach the strainer surface at a right angle thereto, but rather to require all the fluid to approach the strainer surface while flowing substantially parallel thereto. This shielding of the strainer surface, giving a controlled directional approach to the liquid to be strained, is a fundamental point of my invention and it greatly reduces the tendency of over-sized particles to flow into and clog the spaces 49 between adjacent filter bars. I find it advantageous to space the shield from the strainer surface at such a distance as will cause the liquid flowing therebetween to attain a minimum entering velocity of the general order of one half foot per second. A range of from one half to two feet per second is ordinarily satisfactory. Having passed through ports 12, the fluid to be strained passes downwardly in the passage between shield 11 and strainer surface 8 and, due to the difference in pressure between the outer and inner faces of the strainer surface, the material tends to flow through the interstices 49 between the strainer bars, thereby finding its way into the interior of rigid frame 7. Strained fluid from the interior of rigid frame 7 passes outward through discharge connection 10 to storage vessel or point of use. As shown in Figures 2 and 3, the oil flowing downwardly in the space between shield 11 and filter surface 8 must pass below the lower extremity of each bar and there sharply reverses its direction in order to pass into the restricted passage between adjacent strainer bars 41.

As shown in Figure 1, the strainer element is in the form of a frustum of an inverted cone, and, as shown in Figures 2, 3 and 4, the face of each strainer bar overhangs and shields the next lower strainer bar. This overhanging and shielding of the face of each strainer bar by the next higher bar gives two very important advantages. The first of these advantages is that particles which are strained out of the fluid at the opening between any two adjacent bars settle down by gravity and that settling carries it away from the face presented by successively retreating bars and causes the separated particles to gravitate straight downward toward the interior surface of shield 11. This removes the separated particles from the strainer surface, and they drift down along shield 11 to the conical collecting cone 13. The rejected material which settles into collecting cone 13 is discharged therefrom through reject discharge line 14. The discharge of this material may be continuous or intermittent, as conditions may require. The second advantage of having each strainer bar overhang its next lower bar is that this design necessitates a sharp change in direction of the material approaching the filter surface, and that sharp changing of direction tends to throw out part of the suspended material before it even reaches the constriction 49 between the bars. That action, by throwing out a substantial portion of the suspended material before it reaches the constrictions 49 between successive bars, greatly increases the capacity of the apparatus.

Figure 3 illustrates a bar 41 of a cross-sectional design which I have found especially advantageous. It will be seen from the drawing that the lower edge 46 of each strainer bar overhangs the upper edge 47 of the next lower strainer bar. The tortuous course which must be taken by the fluid approaching the strainer surface is indicated by arrow 48. The further retreated position of each successively lower filter bar causes the filter surface to retreat away from the downward path of particles which have been rejected at higher points on the filter surface, thus permitting these particles to drift straight downward by gravity to the inner face of the shield 11.

The shape of the filter bar shown in Figure 4 is simpler than the specific form shown in Figure 3, but it nevertheless does operate in the same way and have the same advantages as described for the form shown in Figure 3. As will be noted from Figures 2, 3 and 4, I always use strainer bars with cross sections that decrease in thickness from their outer faces to their bases which seat in recesses 40.

A portion of the clean fluid which has already passed through the strainer is picked up by a pump 27 and directed through conduit 28, to shaft 23 and thence through ports 29 and manifold-arm 25 to cleaning-nozzle manifold 24. Cleaning-nozzle manifold 24 carries a series of jet nozzles 50 throughout the length of its outer face, and the previously strained fluid, under pressure of pump 27, is forced in jets out of nozzles 50 against the inner face of strainer surface 8. These high velocity jets dislodge and flush away from the strainer surface such oversized particles as have been rejected at the constrictions 49 between adjacent strainer bars but which have nevertheless lodged thereagainst.

Rotative power applied through drive shaft 35 rotates pinion 34, and that in turn rotates gear 33 on hollow bearing housing 30. This rotating bearing housing 30, carrying manifold-arm 25 together with manifold 24, causes those parts to rotate inside of rigid frame 7 and thereby to sweep the entire inner face of the strainer surface with jets of strained fluid which issue from nozzles or orifices 50. These jets, at each revolution of the cleaning-nozzle manifold, cause a brief interval of reverse flow at each point on the constricted openings 49 and thereby dislodge particles which have lodged against those openings.

What I claim is:

1. A device for continuous removal of solids from a flowing liquid which comprises an enclosing shell having liquid inlet and outlet connections and, at the bottom thereof, a reject discharge connection for the removal therefrom of precipitated solids; within the said shell and interposed in the passageway from the inlet to the outlet connections thereof, a strainer element comprising a rigid frame in the general shape of an inverted truncated cone, carrying on its exterior a strainer surface comprising a plurality of strainer bars encircling the said rigid frame with each bar spaced uniformly from its adjacent bars and thereby forming constricted openings therebetween, and with each successive bar from the top to the bottom of said inverted truncated cone of greater diameter than the next lower bar; the said device for removal of solid from flowing liquid further comprising a second inverted truncated cone surrounding the strainer surface, imperforate below the top of said strainer surface, positioned coaxially therewith and slightly removed therefrom; passages to direct the flowing liquid from the inlet connection into the second inverted cone at a point not substantially lower than the top of the strainer surface; a second reject discharge connection to permit the discharge of rejected solids from the bottom of the second inverted truncated cone; a rotatable member positioned within the rigid frame, positioned coaxially therewith and carrying an arm extending from top to bottom of the strainer surface and adjacent thereto, a continuous passage through the interior of said rotatable member and the said arm extending therefrom, a plurality of orifices extending through the wall of said arm and positioned to direct jets of liquid from the interior passage thereof against the inner face of the strainer surface; a pump; a conduit for the passage of liquid from a point on the outlet side of the straining device to the inlet side of the pump, and a second connection for the passage of liquid from the discharge side of said pump to the passage through the interior of said rotatable member.

2. A device for continuous removal of solids from a flowing liquid which comprises a vertically positioned enclosing shell of generally cylindric shape, a liquid inlet connection tangentially entering the side thereof, a liquid discharge connection at the top thereof, and a reject discharge connection at the base thereof for the removal therefrom of solids precipitated therein; within the said enclosing shell and interposed between the liquid inlet connection and the liquid discharge connection thereof, a strainer element comprising a rigid open framework in the general shape of an inverted truncated cone, carrying on its exterior a strainer surface comprising a plurality of strainer bars encircling the said open framework and embedded therein, with each bar wider at the said strainer surface than where embedded in said open framework, with each bar spaced uniformly from its adjacent bars and thereby forming constricted openings therebetween, and with each successive bar from the top to the bottom of said strainer surface of less external diameter than the next higher bar, and with the lower external edge of each such bar having a diameter not less than the maximum diameter of said bar; the said device for removal of solids from a flowing liquid further comprising a second inverted truncated cone of imperforate material positioned between the inlet connection and the strainer surface and fully surrounding the strainer surface, also positioned coaxially with the said strainer surface and extending the full length thereof, and slightly removed therefrom to form a free passageway therebetween for the downward passage of liquid between the strainer surface and the second inverted truncated cone; a passageway to conduct liquid from the inlet connection into the top of the said second inverted truncated cone at a point not substantially lower than the uppermost strainer bar of the strainer surface; a second reject discharge connection at the base of the second inverted truncated cone to permit the discharge of rejected solids from the interior thereof; a rotatable member positioned within the rigid open framework, positioned coaxially therewith, carrying an arm extending from top to bottom of the strainer surface and adjacent thereto, a continuous passage through the interior of said rotatable member and the said arm extending therefrom, a plurality of orifices extending through the wall of said arm and positioned to direct jets of liquid from the interior passage thereof against the discharge side of the strainer surface; a pump; a conduit to conduct liquid from a point on the discharge side of the strainer element to the inlet connection of the pump and a second conduit to conduct liquid from the discharge connection of the said pump to the said continuous passage through the interior of the said rotatable member.

3. A device for continuous removal of solids from a flowing liquid which comprises a vertically positioned enclosing shell of generally cylindric shape, a liquid inlet connection tangentially entering the side thereof, a liquid discharge connection at the top thereof, and a reject discharge connection at the base thereof for the removal therefrom of solids precipitated therein; within the said enclosing shell and interposed between the liquid inlet connection and the liquid discharge connection thereof, a strainer element comprising a rigid open framework in the general shape of an inverted truncated cone, carrying on its exterior a strainer surface comprising a plurality of strainer bars encircling the said open framework and fastened thereto, with each bar spaced uniformly from its adjacent bars and thereby forming constricted openings therebetween, and with each successive bar from the top to the bottom of said strainer surface of less external diameter than the next higher bar, and with the lower external edge of each such bar having a diameter not less than the maximum diameter of said bar; the said device for removal of solids from a flowing liquid further comprising a second inverted truncated cone of imperforate material positioned between the inlet connection and the strainer surface and fully surrounding the strainer surface, also positioned coaxially with the said strainer surface and extending the full length thereof, and slightly removed therefrom to form a free passageway therebetween for the downward passage of liquid between the strainer surface and the second inverted truncated cone; a passageway to conduct liquid from the inlet connection into the top of the said second inverted truncated cone at a point not substantially lower than the uppermost strainer bar of the strainer surface; a second reject discharge connection at the base of the second inverted truncated cone to permit the discharge of rejected solids from the interior thereof; a rotatable member positioned within the rigid open framework, positioned coaxially therewith, carrying an arm extending from top to bottom of the strainer surface and adjacent thereto, a continuous passage through the interior of said rotatable member and the said arm extending therefrom, a plurality of orifices extending through the wall of said arm and positioned to direct jets of liquid from the interior passage thereof against the discharge side of the strainer surface; a pump; a conduit to conduct liquid from a point on the discharge side of the strainer element to the inlet connection of the pump and a second conduit to conduct liquid from the discharge connection of the said pump to the said continuous passage through the interior of the said rotatable member.

4. A device for continuous removal of solids from a flowing liquid which comprises a vertically positioned enclosing shell, a liquid inlet connection entering the side thereof, a liquid discharge connection at the top thereof, and a reject discharge connection at the base thereof for the removal therefrom of solids precipitated therein; within the said enclosing shell and interposed between the liquid inlet connection and the liquid discharge connection thereof, a strainer element comprising a rigid open framework in the general shape of an inverted truncated cone, carrying on its exterior a strainer surface comprising a plurality of strainer bars encircling the said open framework, with each bar spaced uniformly from its adjacent bars and thereby forming constricted openings therebetween, and with each successive bar from the top to the botttom of said strainer surface of less external diameter than the next higher bar, and with the lower external edge of each such bar having a diameter not less than the maximum diameter of said bar; the said device for removal of solids from a flowing liquid further comprising a second inverted truncated cone of imperforate material positioned between the inlet connection and the strainer surface and fully surrounding the strainer surface, also positioned coaxially with the said strainer surface and extending the full length thereof, and slightly removed therefrom to form a free passageway therebetween for the downward passage of liquid between the strainer surface and the second inverted truncated cone; a passageway to conduct liquid from the inlet connection into the top of said second inverted truncated cone at a point not substantially lower than the uppermost strainer bar of the strainer surface; a second reject discharge connection at the base of the second inverted truncated cone to permit the discharge of rejected solids from the interior thereof; a rotatable member positioned within the rigid open framework, positioned coaxially therewith, carrying an arm extending from top to bottom of the strainer surface and adjacent thereto, a continuous passage through the interior of said rotatable member and the said arm extending therefrom, a plurality of orifices extending through the wall of said arm and positioned to direct jets of liquid from the interior passage thereof toward the constricted passages between adjacent strainer bars; a pump; a conduit to conduct liquid from a point on the discharge side of the strainer element to the inlet connection of the pump and a second conduit to conduct liquid from the discharge connection of the said pump to the said continuous passage through the interior of the said rotatable member.

5. A device for continuous removal of solids from a flowing liquid which comprises a vertically positioned enclosing shell of generally cylindric shape, a liquid inlet connection tangentially entering the side thereof, a liquid discharge connection at the top thereof, and a reject discharge connection at the base thereof for the removal therefrom of solids precipitated therein; within the said enclosing shell and interposed between the liquid inlet connection and the liquid discharge connection thereof, a strainer element comprising a rigid open framework in the general shape of an inverted truncated cone, carrying on its exterior a strainer surface comprising a plurality of strainer bars encircling the said open framework and embedded therein, with each bar wider at the said strainer surface than where embedded in said open framework, with each bar spaced uniformly from its adjacent bars and thereby forming constricted openings therebetween, and with each successive bar from the top to the bottom of said strainer surface of less external diameter than the next higher bar, and with the lower external edge of each such bar having a diameter not less than the maximum diameter of said bar; the said device for removal of solids from a flowing liquid further comprising a second inverted truncated cone of imperforate material positioned between the inlet connection and the strainer surface and fully surrounding the strainer surface, also positioned coaxially with the said strainer surface and extending the full length thereof, and slightly removed therefrom to form a free passageway therebetween for the downward passage of liquid between the strainer surface and the second inverted truncated cone; a baffle of cylindric shape positioned inside the enclosing shell, between said enclosing shell and the second inverted truncated cone and opposite the inlet connection, with open communication around the bottom thereof for the precipitation of heavy solids into the base of the enclosing shell and for the passage of the flowing liquid from the inlet connection to and into the top of the second inverted truncated cone, and a closure member closing off the space between the top of said cylindric baffle and the adjacent wall of the enclosing shell; a second reject discharge connection at the base of the second inverted truncated cone to permit the discharge of rejected solids from the interior thereof; a rotatable member positioned within the rigid open framework, positioned coaxially therewith, carrying an arm extending from top to bottom of the strainer surface and adjacent thereto, a continuous passage through the interior of said rotatable member and the said arm extending therefrom, a plurality of orifices extending through the wall of said arm and positioned to direct jets of liquid from the interior passage thereof against the discharge side of the strainer surface; a pump; a conduit to conduct liquid from a point on the discharge side of the strainer element to the inlet connection of the pump and a second conduit to conduct liquid from the discharge connection of the said pump to the said continuous passage through the interior of the said rotatable member.

6. A device for continuous removal of solids from a flowing liquid which comprises a vertically positioned enclosing shell of generally cylindric shape, a liquid inlet connection tangentially entering the side thereof, a liquid discharge connection at the top thereof, and a reject discharge connection at the base thereof for the removal therefrom of solids precipitated therein; within the said enclosing shell and interposed between the liquid inlet connection and the liquid discharge connection thereof, a strainer element comprising a rigid open framework in the general shape of an inverted truncated cone, carrying on its exterior a strainer surface comprising a plurality of strainer bars encircling the said open framework, with each bar spaced uniformly from its adjacent bars and thereby forming constricted openings therebetween, and with each successive bar from the top to the bottom of said strainer surface of less external diameter than the next higher bar, and with the lower external edge of each such bar having a diameter not less than the maximum diameter of said bar; the said device for removal of solids from a flowing liquid further comprising a second inverted truncated cone of imperforate material positioned between the inlet connection and the strainer surface and fully surrounding the strainer surface, also positioned coaxially with the said strainer surface and extending the full length thereof, and slightly removed therefrom to form a free passageway therebetween for the downward passage of liquid between the strainer surface and the second inverted truncated cone; a baffle of cylindric shape positioned inside the enclosing shell, between said enclosing shell and the second inverted truncated cone and opposite the inlet connection, with open communication around the bottom thereof for the precipitation of heavy solids into the base of the enclosing shell and for the passage of the flowing liquid from the inlet connection to and into the top of the second inverted truncated cone, and a closure member closing off the space between the top of said cylindric baffle and the adjacent wall of the enclosing shell; a second reject discharge connection at the base of the second inverted truncated cone to permit the discharge of rejected solids from the interior thereof; a rotatable member positioned within the rigid open framework, positioned coaxially therewith, carrying an arm extending from top to bottom of the strainer surface and adjacent thereto, a continuous passage through the interior of said rotatable member and the said arm extending therefrom, a plurality of orifices extending through the wall of said arm and positioned to direct jets of liquid from the interior passage thereof toward the constricted passages between adjacent strainer bars; a pump, a conduit to conduct liquid from a point on the discharge side of the strainer element to the inlet connection of the pump and a second conduit to conduct liquid from the discharge connection of the said pump to the said continuous passage through the interior of the said rotatable member.

References Cited in the file of this patent

UNITED STATES PATENTS

| | | |
|---|---|---|
| Re. 18,968 | Willers | Oct. 10, 1933 |
| 993,839 | Keyes | May 30, 1911 |
| 1,644,121 | Greene | Oct. 4, 1927 |
| 1,993,214 | Hass | Mar. 5, 1935 |
| 2,015,467 | Beldam | Sept. 24, 1935 |
| 2,024,753 | Zwicky | Dec. 17, 1935 |
| 2,046,456 | Johnson | July 7, 1936 |
| 2,068,282 | Strindberg | Jan. 19, 1937 |
| 2,188,643 | Laderer | Jan. 30, 1940 |
| 2,390,841 | Longden | Dec. 11, 1945 |
| 2,489,292 | Hobbs | Nov. 29, 1949 |

FOREIGN PATENTS

| | | |
|---|---|---|
| 16,713 | Norway | Sept. 21, 1906 |
| 69,417 | Sweden | Jan. 14, 1925 |
| 149,485 | Germany | Mar. 9, 1904 |
| 264,011 | Great Britain | Jan. 13, 1927 |
| 630,915 | France | Dec. 12, 1927 |